United States Patent
Yazici et al.

(10) Patent No.: US 12,180,911 B2
(45) Date of Patent: Dec. 31, 2024

(54) DUCTED FIREWALL WITH UPPER BIFI BLEED FOR MODULATED CORE VENTILATION

(71) Applicant: Raytheon Technologies Corporation, Farmington, CT (US)

(72) Inventors: Murat Yazici, Glastonbury, CT (US); Marc J. Muldoon, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/137,887

(22) Filed: Apr. 21, 2023

(65) Prior Publication Data
US 2024/0352906 A1    Oct. 24, 2024

(51) Int. Cl.
| | |
|---|---|
| F02K 3/04 | (2006.01) |
| B64D 45/00 | (2006.01) |
| F02C 6/06 | (2006.01) |
| F02C 7/18 | (2006.01) |
| F02C 7/25 | (2006.01) |
| F04D 27/00 | (2006.01) |

(52) U.S. Cl.
CPC .................. *F02K 3/04* (2013.01); *F02C 6/06* (2013.01); *F02C 7/18* (2013.01); *F02C 7/25* (2013.01); *F04D 27/009* (2013.01); *B64D 2045/009* (2013.01)

(58) Field of Classification Search
CPC ...... F02C 7/25; F02C 7/12; F02C 7/14; F02C 7/18; F02C 7/185; F02C 6/06; B64D 2045/009; F02K 3/04; F02K 3/06; F02K 3/065
See application file for complete search history.

(56) References Cited

U.S. PATENT DOCUMENTS

| | | | | |
|---|---|---|---|---|
| 4,163,366 A | * | 8/1979 | Kent .......................... | F02C 7/25 |
| | | | | 60/226.1 |
| 6,058,696 A | * | 5/2000 | Nikkanen ................. | F02C 7/04 |
| | | | | 60/262 |

(Continued)

FOREIGN PATENT DOCUMENTS

FR    3108942 B1    3/2022

OTHER PUBLICATIONS

EP Search Report for EP Patent Application No. 24171443.5 dated Sep. 13, 2024.

*Primary Examiner* — Alain Chau
(74) *Attorney, Agent, or Firm* — Getz Balich LLC (57) ABSTRACT

A gas turbine engine is provided that includes fan, compressor, combustor, and turbine sections, an outer casing, an outside core annular region, and a fan air circulation system. The outer casing is disposed radially outside of the compressor, combustor, and turbine sections. The engine has a core gas path and a fan bypass air duct. The core gas path extends through the compressor, combustor, and turbine sections, and is disposed radially inside of the outer casing. The fan bypass air duct is defined by inner and outer radial flow path boundaries. The outside core annular region is disposed radially between the outer casing and the inner radial boundary flow path boundary. The fan air circulation system is configured to receive fan bypass air from the fan bypass air duct and selectively pass the received fan bypass air into the outside core annular region.

20 Claims, 5 Drawing Sheets

(56) References Cited

U.S. PATENT DOCUMENTS

| | | |
|---|---|---|
| 7,665,310 B2 | 2/2010 | Laborie |
| 7,861,513 B2 | 1/2011 | Stretton |
| 8,092,153 B2* | 1/2012 | Strecker .................. F01D 9/065 |
| | | 415/176 |
| 8,650,854 B2 | 2/2014 | Migliaro, Jr. |
| 8,739,516 B2 | 6/2014 | Bulin |
| 9,234,481 B2 | 1/2016 | Suciu |
| 9,416,730 B2 | 8/2016 | Skilton |
| 9,976,484 B2* | 5/2018 | Sawyers-Abbott ....... F02C 7/25 |
| 10,024,242 B2* | 7/2018 | Goulds .................... F02C 7/18 |
| 10,443,428 B2* | 10/2019 | Xu ............................. F02C 9/18 |
| 10,443,429 B2* | 10/2019 | Suciu .................... F01D 17/145 |
| 10,590,799 B2* | 3/2020 | Zebian .................. F01D 17/085 |
| 10,633,998 B2 | 4/2020 | Suciu |
| 10,731,560 B2 | 8/2020 | Snape |
| 10,927,763 B2* | 2/2021 | Suciu ....................... F02C 7/18 |
| 11,098,649 B2 | 8/2021 | Pau, Jr. |
| 11,162,458 B2 | 11/2021 | Schacht |
| 11,208,913 B2* | 12/2021 | Xu ............................. F02C 9/18 |
| 11,230,975 B2* | 1/2022 | Sawyers-Abbott ....... F02C 9/34 |
| 11,846,233 B2* | 12/2023 | Sommerer ............. B64D 33/08 |
| 11,951,341 B2* | 4/2024 | Sommerer ................ F02C 7/18 |
| 2010/0150700 A1* | 6/2010 | Strecker .................... F02C 6/08 |
| | | 415/145 |
| 2012/0034068 A1* | 2/2012 | Hussain .................... F02C 9/18 |
| | | 415/115 |
| 2012/0227375 A1* | 9/2012 | Badcock .................. F02C 7/18 |
| | | 60/262 |
| 2015/0101331 A1 | 4/2015 | Goulds |
| 2015/0369065 A1* | 12/2015 | Feiereisen ................ F02C 7/04 |
| | | 415/144 |
| 2016/0326903 A1* | 11/2016 | Xu ............................. F02C 9/18 |
| 2016/0333728 A1* | 11/2016 | Suciu .................... F01D 17/145 |
| 2017/0184025 A1* | 6/2017 | Sawyers-Abbott ....... F02C 7/12 |
| 2017/0191420 A1* | 7/2017 | Clarke .................. F01D 17/145 |
| 2017/0284298 A1* | 10/2017 | Suciu ....................... F02K 3/065 |
| 2018/0230908 A1 | 8/2018 | Pesyna |
| 2018/0363492 A1* | 12/2018 | Suciu .................... F01D 17/145 |
| 2019/0120082 A1* | 4/2019 | Zebian .................... F01D 25/14 |
| 2019/0234231 A1* | 8/2019 | Xu ............................. F02C 9/18 |
| 2020/0240361 A1* | 7/2020 | Schacht .................... F02K 3/00 |
| 2021/0261267 A1* | 8/2021 | Sommerer ................ F02C 7/18 |
| 2022/0219029 A1* | 7/2022 | Sommerer ............. A62C 35/02 |
| 2022/0403780 A1* | 12/2022 | Price ........................ F02C 7/14 |

* cited by examiner

DUCTED FIREWALL WITH UPPER BIFI BLEED FOR MODULATED CORE VENTILATION

BACKGROUND OF THE INVENTION

1. Technical Field

This disclosure relates to gas turbine engines in general, and to gas turbine engines with cooling for components disposed external to the core gas path of the engine in particular.

2. Background Information

A gas turbine engine (e.g., a turbofan engine) may be configured to produce thrust within a core gas path and by fan bypass air. Air drawn into a turbofan engine exits the fan section of the engine and either passes into the "core" of the engine (e.g., through the compressor, combustor, and turbine sections) or passes through a fan duct disposed radially outside of the core engine. In an ideal scenario, all of the air passing through the fan duct would be dedicated to producing thrust. In reality, however, it is common to bleed some amount of fan air off of the fan duct for a variety of different uses; e.g., for cooling purposes, for purging purposes, or the like. Fan air bled off of the fan duct may provide a valuable function (e.g., cooling, purging, or the like) but once bled, it very often does not provide thrust. Hence, air bled off of the fan duct very often undesirably decreases the thrust-specific fuel consumption (TSFC) of the engine.

A fan bypass air duct is typically defined by an outer flow path boundary and an inner flow path boundary. The outer fan flow path boundary may be formed by one or more inner radial panels of the nacelle in which the engine is disposed. The inner fan flow path boundary may be formed by one or more panels typically referred to as inner frame structure panels ("IFS" panels). The IFS panels collectively form an annular structure that is disposed radially outside of the outer case of the engine. The IFS panels and the engine outer case collectively define an annular region disposed outside of the core of the engine (referred to hereinafter as the "outside core annual region"). In many instances, a gas turbine engine will include components (e.g., fluid lines, actuators, sensors, harnesses, and the like—referred to hereinafter as "external components") that are disposed in the outside core annular region. During operation of the engine, significant thermal energy is developed within the core of the engine; e.g., within the compressor section, the combustor section, the turbine section, or any combination thereof. The thermal energy developed is particularly significant during certain operational phases; e.g., maximum power at take-off, and the like. Some amount of the thermal energy developed within the core of the engine is transferred to the outside core annular region. In many instances, an external component will have a maximum operating temperature, or the useful life of the external component will vary as a function of the ambient temperature (e.g., operating in a higher temperature environment may decrease the useful life of the external component).

What is needed is a system capable of providing an air temperature environment within the outside core annular region that is acceptable to external components, one that typically does not negatively affect the useful life of external components, one that avoids the need to use expensive high operating temperature capable external components, and one that is favorable with respect to the TSFC of the engine.

SUMMARY

According to an aspect of the present disclosure, a gas turbine engine is provided that includes a fan section, a compressor section, a combustor section, a turbine section, an outer casing, an outside core annular region, and a fan air circulation system. The outer casing is disposed radially outside of the compressor section, combustor section, and the turbine section. The engine has a core gas path and a fan bypass air duct. The core gas path extends through the compressor, combustor, and turbine sections, and is disposed radially inside of the outer casing. The fan bypass air duct is defined by inner and outer radial flow path boundaries. The outside core annular region is disposed radially between the outer casing and the inner radial boundary flow path boundary. The fan air circulation system is configured to receive a flow of fan bypass air from the fan bypass air duct and selectively pass the received flow of fan bypass air into the outside core annular region.

In any of the aspects or embodiments described above and herein, the fan air circulation system may include a valve that is disposable in a closed and open configurations. In the open configuration, the flow of fan bypass air into the outside core annular region is volumetrically greater than the flow of fan bypass air into the outside core annular region in the closed configuration.

In any of the aspects or embodiments described above and herein, the valve may be controlled to move from the closed configuration to the open configuration, and vice versa.

In any of the aspects or embodiments described above and herein, the valve may be controlled to move to a plurality of open configurations.

In any of the aspects or embodiments described above and herein, the plurality of open configurations may include a fully open configuration and one or more partially open configurations. The flow of fan bypass air into the outside core annular region in a partially open configuration is volumetrically less than the flow of fan bypass air into the outside core annular region in the fully open configuration.

In any of the aspects or embodiments described above and herein, the fan air circulation system may include a manifold and a plurality of exit ports. The manifold and exit ports may be configured to pass the received flow of fan bypass air into the manifold and thereafter into the outside core annular region through the exit ports.

In any of the aspects or embodiments described above and herein, the exit ports may be spaced apart from one another circumferentially.

In any of the aspects or embodiments described above and herein, the manifold may extend circumferentially and the exit ports may be spaced equidistant from one another around a circumference of the manifold.

In any of the aspects or embodiments described above and herein, the manifold may extend circumferentially and the exit ports may be non-uniformly spaced from one another around a circumference of the manifold.

In any of the aspects or embodiments described above and herein, each of the exit ports may have the same fluid flow characteristics.

In any of the aspects or embodiments described above and herein, the plurality of exit ports may include a first exit port having a first fluid flow characteristic and a second exit port having a second fluid flow characteristic, and the first fluid flow characteristic is different from the second fluid flow characteristic.

In any of the aspects or embodiments described above and herein, the fan air circulation system may include a structure that extends into the fan bypass air duct, the structure including an air inlet. The air inlet is configured to receive the flow of fan bypass air from the fan bypass air duct.

In any of the aspects or embodiments described above and herein, the engine may include an aft fan annular compartment defined in part by the outer casing and a firewall, and the fan air circulation system may include a manifold with a plurality of exit ports, the manifold disposed within the aft fan annular compartment. The fan air circulation system may be configured to have an air path that extends from the air inlet, through the structure, into the manifold, and through the exit ports.

In any of the aspects or embodiments described above and herein, the firewall may separate the aft fan annular compartment from the outside core annular region, and the plurality of exit ports may extend through the firewall.

According to an aspect of the present disclosure, a method of cooling one or more external components of a gas turbine engine is provided. The gas turbine engine includes fan, compressor, combustor, and turbine sections, and an outer casing disposed radially outside of the compressor, combustor, and turbine sections. The gas turbine engine has a core gas path that extends through the compressor, combustor, and turbine sections. The core gas path is disposed radially inside of the outer casing. A fan bypass air duct is defined by inner and outer radial flow path boundaries. An outside core annular region is disposed radially between the outer casing and the inner radial boundary flow path boundary. The one or more external components are disposed in the outside core annular region. The method includes: using a valve to selectively control passage of a flow of fan bypass air from the fan bypass air duct to the outside core annular region, wherein the valve is controllable to move from a first configuration to a second configuration, and controllable to move from the second configuration to the first configuration, wherein in the second configuration, the flow of fan bypass air into the outside core annular region is volumetrically greater than the flow of fan bypass air into the outside core annular region in the first configuration.

In any of the aspects or embodiments described above and herein, the valve may be controllable to move to a plurality of open configurations, including a fully open configuration and one or more partially open configurations. The flow of fan bypass air into the outside core annular region in a partially open configuration is volumetrically less than the flow of fan bypass air into the outside core annular region in the fully open configuration.

In any of the aspects or embodiments described above and herein, the method further including circumferentially distributing the flow of fan bypass air in the outside core annular region.

According to another aspect of the present disclosure, a gas turbine engine is provided that includes a fan section, a compressor section, a combustor section, a turbine section, an outer casing, an outside core annular region, a fan air circulation system, and a system controller. The outer casing is disposed radially outside of the compressor, combustor, and turbine sections. The engine has a core gas path that extends through the compressor, combustor, and turbine sections. The core gas path is disposed radially inside of the outer casing. A fan bypass air duct is defined by an inner radial flow path boundary and an outer radial flow path boundary. The outside core annular region is disposed radially between the outer casing and the inner radial boundary flow path boundary. The fan air circulation system is configured to receive a flow of fan bypass air from the fan bypass air duct and to selectively pass the flow of fan bypass air into the outside core annular region using a valve. The system controller is in communication with the fan air circulation valve and a non-transitory memory storing instructions. The instructions when executed cause the system controller to selectively control passage of the flow of fan bypass air into the outside core annular region using the valve, the selective control including passing a first flow of fan bypass air into the outside core annular region during a first engine operating condition, and passing a second said flow of fan bypass air into the outside core annular region during a second engine operating condition, wherein the first flow of fan bypass air is volumetrically greater than the second flow of fan bypass air.

In any of the aspects or embodiments described above and herein, the first engine operating condition may be a take-off condition and the second engine operating condition may be a cruise condition.

In any of the aspects or embodiments described above and herein, the selective control passage of the flow of fan bypass air into the outside core annular region may be based on a thermal environment within the outside core annular region.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
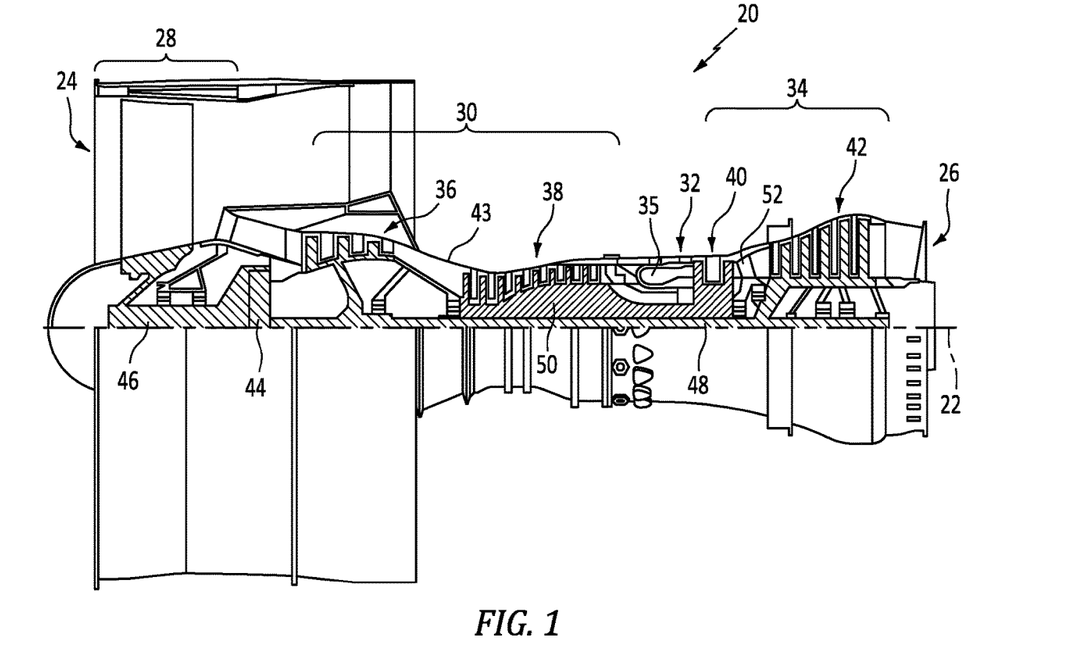
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream airflow inlet 24 and a downstream airflow exhaust 26. The gas turbine engine 20 includes a fan section 28, a compressor section 30, a combustor section 32, and a turbine section 34. The combustor section 32 includes a combustor 35. The compressor section includes a low-pressure compressor (LPC) 36 and a high-pressure compressor (HPC) 38. The turbine section 34 includes a high-pressure turbine (HPT) 40 and a low-pressure turbine (LPT) 42. The engine may be described as having an outer casing 43 disposed radially outside of the compressor, combustor, and turbine sections 30, 32, 34 that defines an outer radial boundary of the core gas path through the engine. The configuration of the outer casing 43 may vary along the core gas path (e.g., a first set of components forming the outer casing 43 within the compressor section, a different set of components forming the outer casing 43 within the combustor section, and so on. The engine sections are arranged sequentially along the centerline 22 within an engine housing. The fan section 28 is connected to a geared architecture 44, for example, through a fan shaft 46. The geared architecture 44 and the LPC 36 are connected to and driven by the LPT 42 through a low-speed shaft 48. The HPC 38 is connected to and driven by the HPT 40 through a high-speed shaft 50. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration, including the two-spool engine configuration shown, and may be utilized with single spool gas turbine engines as well as three spool gas turbine engines and the like.

Figure 2:
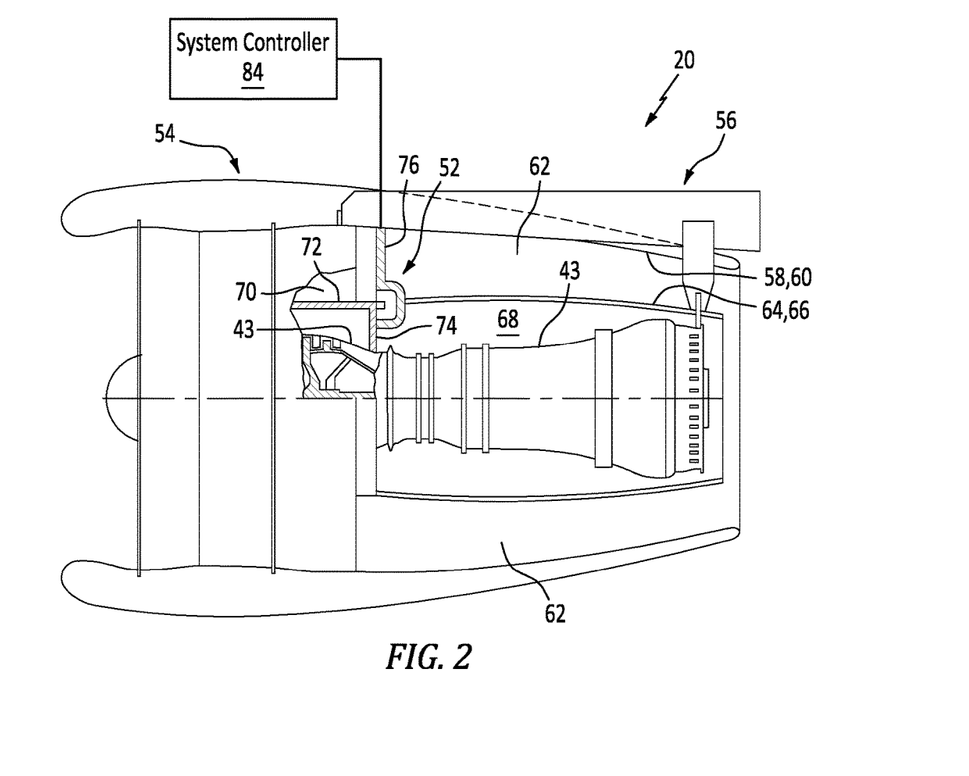
FIG. 2 is a diagrammatic sectional view of a present disclosure gas turbine engine embodiment.

FIG. 2 diagrammatically illustrates a gas turbine engine 20 embodiment generally like that shown in FIG. 1, modified with a fan air circulation system 52 according to an aspect of the present disclosure. FIG. 2 diagrammatically illustrates a nacelle structure 54 and a pylon structure 56. The nacelle 54 includes one or more inner radial panels 58 that define the outer radial flow path boundary 60 of a fan bypass air duct 62. As will be detailed herein, one or more panels typically referred to as inner frame structure panels ("IFS" panels 64) may be used to define the inner radial flow path boundary 66 of the fan bypass air duct 62.

The engine embodiment shown in FIG. 2 includes an annular region (i.e., the "outside core annular region 68") disposed between engine outer casing 43 and the inner radial flow path boundary 66 for the fan bypass air.

The engine embodiment shown in FIG. 2 includes an aft fan annular compartment ("AF annular compartment 70") that is defined generally by a portion of the outer casing 43 (disposed radially outside of a compressor section), an annular aft inner diameter panel ("aft ID panel 72"), and a firewall 74. The aft ID panel 72 is disposed radially outside of and spaced apart from the outer casing 43. The aft ID panel 72 extends axially from the fan rotor stage and forms a part of the inner radial flow boundary for the fan bypass air duct 62. The firewall 74 is engaged with the outer casing 43 and the aft ID panel 72, extending therebetween in a generally radial plane. The AF annular compartment 70 is disposed forward of the outside core annular region 68.

Figure 4:
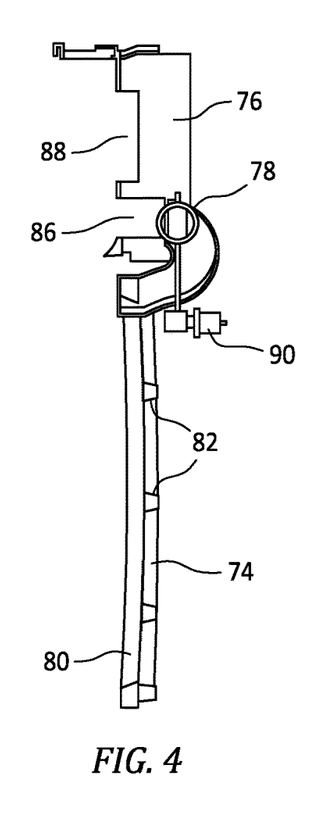
FIG. 4 is a diagrammatic side view of a present disclosure fan air circulation system embodiment.
Figure 4A:
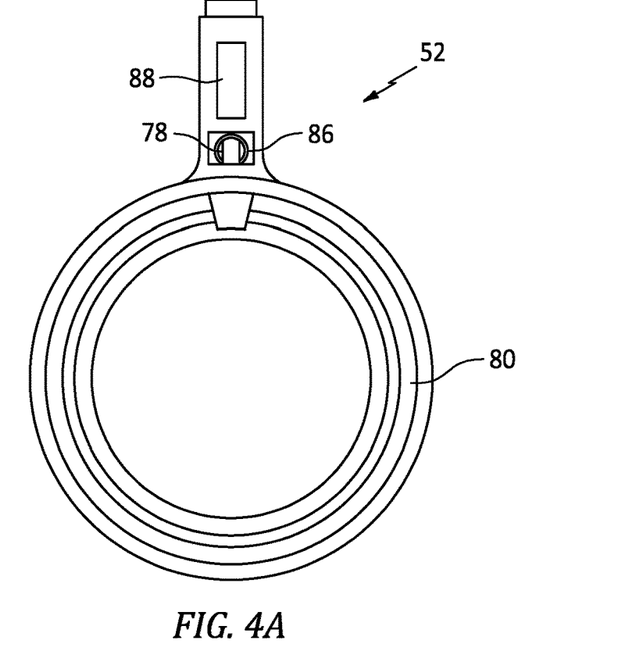
FIG. 4A is a diagrammatic planar view of system embodiment shown in FIG. 4, from a forward looking aft perspective.

The fan air circulation system 52 includes a structure 76 that extends into the fan bypass air duct 62, a valve 78, a distribution manifold 80, and a plurality of exit ports 82 (components 78, 80, and 82 illustrated in at least FIG. 4). In some embodiments, the fan air circulation system 52 may include a system controller 84.

Figure 3:
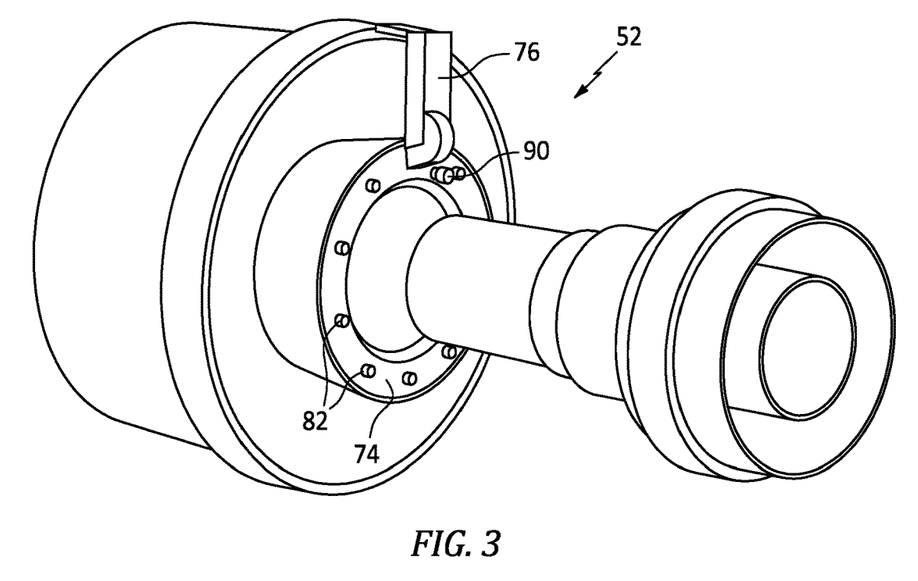
FIG. 3 is a perspective view of a present disclosure gas turbine engine embodiment.
Figure 4B:
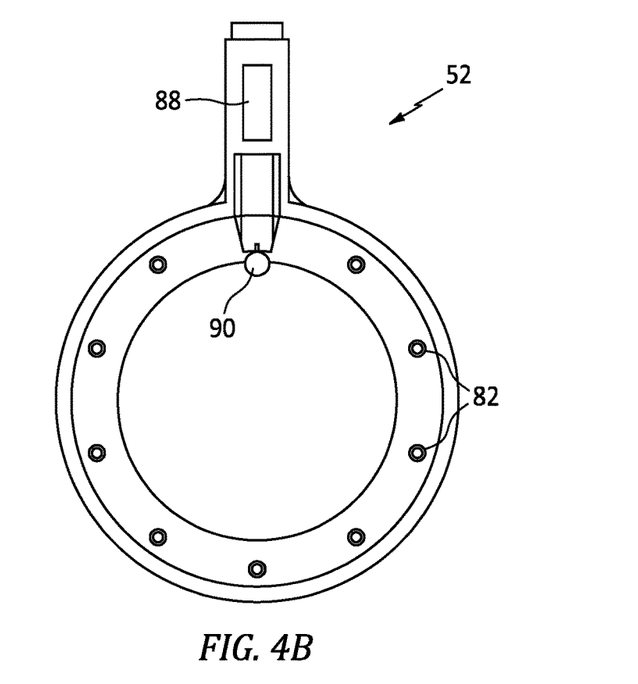
FIG. 4B is a diagrammatic planar view of system embodiment shown in FIG. 4, from an aft looking forward perspective.
Figure 5:
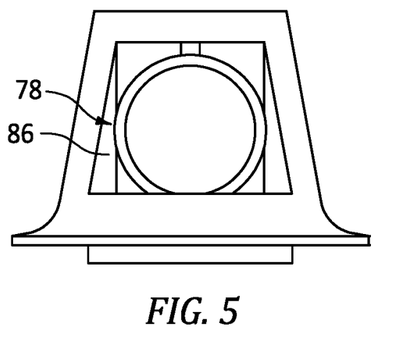
FIG. 5 is a partial view of a present disclosure structure including a valve embodiment shown in an open position.
Figure 5A:
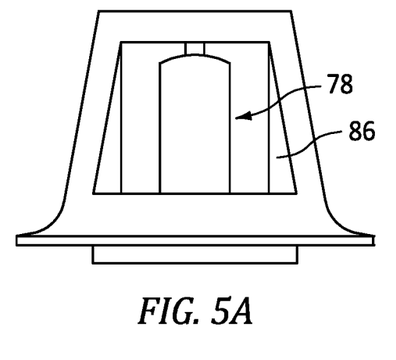
FIG. 5A is a partial view of the structure shown in FIG. 5 now in a closed position.
Figure 6:
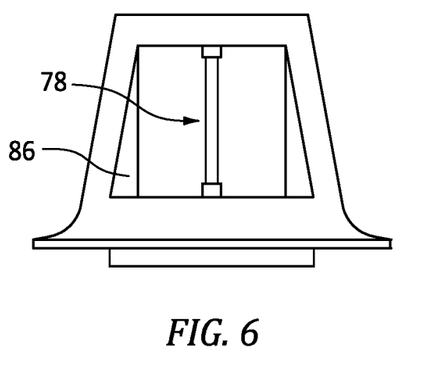
FIG. 6 is a partial view of a present disclosure structure including a valve embodiment shown in an open position.
Figure 6A:
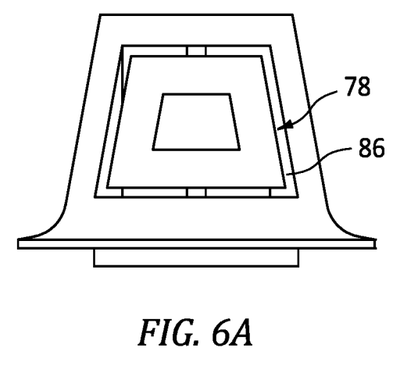
FIG. 6A is a partial view of the structure shown in FIG. 6 now in a closed position.

In the embodiments shown in FIGS. 3-4B, the structure 76 extending into the fan bypass air duct 62 (see FIG. 2) is configured to function as an upper bifurcation member and as a fluid flow device (to facilitate the description herein, the structure will be referred to hereinafter as the "upper bifi 76"). The upper bifi 76 may have a relatively narrow circumferential width, and a radial height that extends from the aft ID panel 72 to the outer radial flow boundary 60 of the fan bypass air duct 62. The upper bifi 76 includes a first air inlet 86 disposed proximate the aft ID panel 72. In this configuration, the first air inlet 86 may function as a "ram" air inlet. In some embodiments, the upper bifi 76 may also include a second air inlet 88 disposed proximate the outer radial end of the upper bifi 76. The second air inlet 88 may be configured to capture fan bypass air flow for use as cabin air within the aircraft and the like. With the exception of the first air inlet 86 (and the second air inlet 88 when included), the upper bifi 76 is configured to direct fan bypass air flow around components disposed within the nacelle ("interior nacelle components") and thereby mitigate flow losses that would otherwise result from the interaction between the fan bypass air flow and the interior nacelle components.

The upper bifi 76 is configured to provide air flow communication between the first air inlet 86 and the distribution manifold 80. As will be detailed hereinafter, the distribution manifold 80 may be attached to the firewall 74 and disposed within the AF annular compartment 70. The air flow communication between the upper bifi 76 and the distribution manifold 80 may be accomplished in a variety of different ways. For example, the upper bifi 76 embodiment shown in FIGS. 2-4 includes a "C" shaped conduit having a first end disposed at the air inlet 86 and a distal second end disposed at the firewall 74. The distal end of the "C"-shaped conduit may be configured to extend through the firewall 74 for direct engagement with the manifold 80 (or vice versa), or there may be a piping/tubing interface that extends through the firewall 74 and engages with both the C-shaped conduit and the manifold 80. The present disclosure is not limited to any particular fluid flow interface between the C-shaped conduit and the manifold 80.

The valve 78 is configured to permit selective adjustment of the volumetric amount of fan bypass air flow that may pass into the manifold 80. In some embodiments, the valve 78 may be adjustable between an entirely closed position wherein no fan bypass air flow passes into the manifold 80 and an entirely open position wherein a maximum volumetric amount of fan bypass air flow passes into the manifold 80. In some embodiments, the valve 78 may be adjustable in a plurality of partially open positions (e.g., 25% open, 50% open, 75% open, and the like) wherein less than a maximum volumetric amount of fan bypass air flow passes into the manifold 80. FIGS. 5, 5A, 6, and 6A diagrammatically illustrate examples of valve 78 types that may be used (e.g., ball orifice, plate orifice, and the like). The present disclosure is not limited to any particular valve type. The valve 78 may be actuated between operating positions (e.g., closed, partially open, fully open) by an actuator 90. The present disclosure is not limited to any particular type of actuator 90; e.g., pneumatic, electric, hydraulic. The actuator 90 may itself be configured to produce valve gate positional data or an independent sensor may be used to provide valve gate positional feedback.

Figure 7:
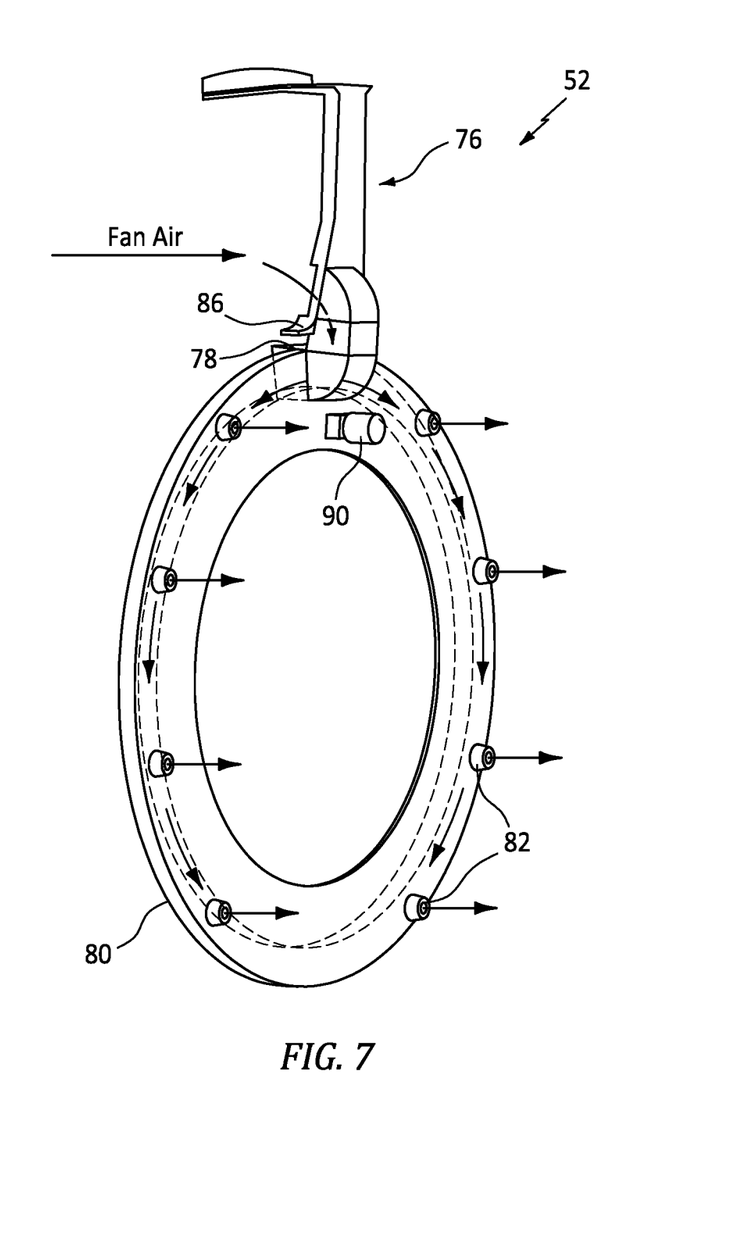
FIG. 7 is a diagrammatic perspective view of a present disclosure fan air circulation system embodiment.

The manifold 80 is in fluid communication with at least one exit port 82, and preferably a plurality of exit ports 82. The exit ports 82 are in "fluid communication" with the manifold 80 such that fan bypass air flow may pass from the manifold 80, through the exit ports 82 and to the outside core annular region 68. The exit ports 82 may be integral with the manifold 80, or they may be independent of the manifold 80. The exit ports 82 may extend through the firewall 74. FIGS. 4B and 7 arbitrarily show eight (8) exit ports 82 for illustration purposes. The number of exit ports 82 can be varied to produce a desirable distribution of fan bypass air into the outside core annular region 68; e.g., a greater number of exit ports 82 may facilitate a more uniform circumferential distribution of fan bypass air into the outside core annular region 68.

As will be described herein, a gas turbine engine 20 will typically include components (e.g., fluid lines, actuators, sensors, harnesses, and the like—referred to hereinafter as "external components") that are disposed in the outside core annular region 68. The heat transfer path from the engine core to the outside core annular region 68 may not be circumferentially uniform. The external components may not be uniformly distributed around the circumference of the engine 20. Some external engine components may benefit from a greater amount of cooling flow than other external components; e.g., a first external component having a greater thermal tolerance than a second external component. The present disclosure fan air circulation system 52 provides a mechanism that can be used to customize the distribution of fan bypass air flow to better meet the cooling needs of the external components. For example, in the system diagrammatically shown in FIGS. 4B and 7, the eight (8) exit ports 82 are shown uniformly distributed around the circumference of the manifold 80. In alternative embodiments, the exit ports 82 may be non-uniformly distributed; e.g., with more exit ports 82 disposed in certain circumferential regions and fewer exit ports 82 disposed in other circumferential regions. In other embodiments, the flow size of the exit ports 82 may be uniform or may be varied to vary the fan bypass air flow. The manifold 80 is diagrammatically shown in FIGS. 4A, 4B, and 7 as a single body. The present disclosure is not limited to any particular manifold 80 configuration. For example, in some embodiments, the manifold 80 may include a plurality of conduits rather than a single circumferentially extending conduit to facilitate a more uniform distribution of fan bypass air flow to the respective exit ports 82. The above described manifold 80 and exit port 82 embodiments may be combined in any combination.

In those present disclosure system embodiments that include a system controller 84, the controller 84 is in communication with other system components, such as the valve 78, sensors, and one or more controllers associated with the aircraft; e.g., the FADEC. The system controller 84 may be in communication with these components to control and/or receive signals therefrom to perform the functions described herein. The system controller 84 may include any type of computing device, computational circuit, processor (s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller 84 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller 84 may include, or may be in communication with, an input device that enables a user to enter data and/or instructions, and may include, or be in communication with, an output device. Communications between the system controller 84 and other system components may be via a hardwire connection or via a wireless connection.

In the operation of a gas turbine engine 20 with the present disclosure system 52, air drawn into the engine 20 passes through the fan section 28 of the engine 20 and either passes into the "core" of the engine 20 (e.g., through the compressor, combustor, and turbine sections) or passes into the fan bypass air duct 62 disposed radially outside of the core engine. In an ideal scenario, all of the air passing through the fan bypass air duct 62 would be dedicated to producing thrust. In reality, however, it is common to bleed some amount of fan bypass air off of the fan bypass air duct 62 for a variety of different uses; e.g., for cooling purposes, for purging purposes, or the like. Fan bypass air bled off of the fan bypass air duct 62 may provide a valuable function (e.g., cooling, purging, or the like) but once bled, it very often does not provide thrust. Hence, air bled off of the fan bypass air duct 62 very often undesirably decreases the thrust-specific fuel consumption (TSFC) of the engine 20.

The present disclosure system provides a fan air circulation system 52 that is configurable and/or can be controlled to provide cooling air into the outside core annular region 68 for cooling external components of the engine 20. In particular, the present disclosure system fan air circulation system 52 is controllable to selectively provide varying amounts of fan bypass air for cooling purposes. In an engine operating condition wherein high thermal loads are produced (e.g., maximum power at take-off, or the like), the present disclosure system fan air circulation system 52 can be controlled to deliver a maximum amount of fan bypass air for cooling purposes. In an engine operating condition where lower thermal loads are produced (e.g., at cruise, or the like), the present disclosure system fan air circulation system 52 can be controlled to deliver less than a maximum amount of fan bypass air for cooling purposes; i.e., an optimum amount of cooling air. A desired volumetric flow of fan bypass air for cooling purposes may be based on empirical data (e.g., data collected for various operating conditions) or based on real-time sensor data, or any combination thereof, which is in turn used by the system controller 84 to control the valve 78 to produce the desired volumetric flow of fan bypass air for cooling purposes. The stored instructions may relate engine operating conditions to temperatures within the outside core annular region 68 as a function of engine operating conditions, engine operating conditions as a function of time, may consider maximum allowable temperatures for external components, and dictate the amount of cooling air required as a function thereof. As stated herein, the stored instructions may be based on empirical data, or real-time sensor data, or any combination thereof. If the system controller 84 utilizes empirical data, the aforesaid data may be within the system controller 84 stored instructions, or the stored instructions may be based on the empirical data. As an example, the system controller 84 may determine an appropriate valve configuration (to produce the desired volumetric flow of fan bypass air for cooling purposes) based on parameters such as the thrust setting of the engine, the amount of time at a particular thrust setting, the altitude of the aircraft, the ambient air temperature, predetermined maximum external component temperatures, and the like. In this manner, only the amount of air that is required for cooling is bled off of the fan bypass air duct 62. The decrease in the amount of fan bypass air bled off is understood to make an appreciable difference in the engine's TSFC. Furthermore, configurations and/or positions of the present disclosure manifold exit ports 82 that deliver the desired amount of cooling air at the desired circumferential position are also understood to eliminate cooling air waste (i.e., cooling air delivered where it is not needed). As a result, the amount of fan bypass air bled off is understood to be decreased and the engine's TSFC thereby increased.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A gas turbine engine, comprising:
a fan section;
a compressor section;
a combustor section;
a turbine section;
an outer casing disposed radially outside of the compressor section, combustor section, and the turbine section;
wherein the engine has a core gas path that extends through the compressor section, the combustor section, and the turbine section, the core gas path disposed radially inside of the outer casing, and a fan bypass air duct defined by an inner radial flow path boundary and an outer radial flow path boundary, and a member disposed within the fan bypass air duct and extending between the inner radial flow path boundary and the outer radial flow path boundary;
an outside core annular region radially disposed between the outer casing and the inner radial flow path boundary;
an aft fan annular compartment disposed forward of the outside core annular region and defined by the outer casing, an annular aft inner diameter panel and a firewall; and
a fan air circulation system that includes an air inlet disposed within the member and a manifold disposed within the aft fan annular compartment, wherein the fan air circulation system is configured to selectively pass a flow of fan bypass air received from the fan bypass air duct through the air inlet and into the manifold, and pass the flow of fan bypass air into the outside core annular region from the manifold.

2. The gas turbine engine of claim 1, wherein the fan air circulation system includes a valve that is disposable in a closed configuration and an open configuration, wherein in the open configuration, the flow of fan bypass air into the outside core annular region is volumetrically greater than the flow of fan bypass air into the outside core annular region in the closed configuration.

3. The gas turbine engine of claim 2, wherein the valve can be controlled to move from the closed configuration to the open configuration, and can be controlled to move from the open configuration to the closed configuration.

4. The gas turbine engine of claim 3, wherein the valve can be controlled to move to a plurality of open configurations.

5. The gas turbine engine of claim 4, wherein the plurality of open configurations include a fully open configuration and one or more partially open configurations, and wherein the flow of fan bypass air into the outside core annular region in a said partially open configuration is volumetrically less than the flow of fan bypass air into the outside core annular region in the fully open configuration.

6. The gas turbine engine of claim 1, wherein the fan air circulation system further includes a plurality of exit ports in communication with the manifold, wherein the plurality of exit ports are disposed such that the flow of fan bypass air passes through the plurality of exit ports between the manifold and the outside core annular region.

7. The gas turbine engine of claim 6, wherein the exit ports are spaced apart from one another circumferentially.

8. The gas turbine engine of claim 7 wherein the manifold extends circumferentially and the exit ports are spaced equidistant from one another around a circumference of the manifold.

9. The gas turbine engine of claim 7 wherein the manifold extends circumferentially and the exit ports are non-uniformly spaced from one another around a circumference of the manifold.

10. The gas turbine engine of claim 7, wherein each of the exit ports has the same fluid flow characteristics.

11. The gas turbine engine of claim 7, wherein the plurality of exit ports includes a first exit port having a first fluid flow characteristic and a second exit port having a second fluid flow characteristic, and the first fluid flow characteristic is different from the second fluid flow characteristic.

12. The gas turbine engine of claim 1, wherein the fan air circulation system includes a valve that is disposed in the member, which valve is controllable to be disposed in a closed configuration or an open configuration.

13. The gas turbine engine of claim 12, wherein the fan air circulation system includes a plurality of exit ports in communication with the manifold; and
wherein the manifold is attached to the firewall and the plurality of exit ports extend through the firewall.

14. The gas turbine engine of claim 13, wherein the firewall separates the aft fan annular compartment from the outside core annular region.

15. The gas turbine engine of claim 1, wherein the air inlet is disposed in the member at a position that is proximate to but spaced apart from an aft inner diameter panel.

16. The gas turbine engine of claim 15, wherein the air inlet is configured to function as a ram air inlet.

17. A method of cooling one or more external components of a gas turbine engine, the gas turbine engine including a fan section, a compressor section, a combustor section, a turbine section, and an outer casing disposed radially outside of the compressor section, combustor section, and the turbine section, wherein the gas turbine engine has a core gas path that extends through the compressor section, the combustor section, and the turbine section, the core gas path disposed radially inside of the outer casing, a fan bypass air duct defined by an inner radial flow path boundary and an outer radial flow path boundary, a member extending between the inner radial flow path boundary and the outer radial flow path boundary, the member including an air inlet configured to receive a flow of fan bypass air from the fan bypass air duct, and an outside core annular region radially disposed between the outer casing and the inner radial boundary flow path boundary, an aft fan annular compartment disposed forward of the outside core annular region and defined by the outer casing, an annular aft inner diameter panel, and a firewall, wherein the one or more external components are disposed in the outside core annular region, the method comprising:
using a valve to selectively control passage of a flow of fan bypass air from the air inlet disposed within the member to a manifold disposed within the aft fan annular compartment, and thereafter into to the outside core annular region, wherein the valve is controllable to move from a first configuration to a second configuration, and controllable to move from the second configuration to the first configuration, wherein in the second configuration, the flow of fan bypass air into the outside core annular region is volumetrically greater than the flow of fan bypass air into the outside core annular region in the first configuration.

18. A gas turbine engine, comprising:
a fan section;
a compressor section;
a combustor section;
a turbine section;
an outer casing disposed radially outside of the compressor section, combustor section, and the turbine section;
wherein the engine has a core gas path that extends through the compressor section, the combustor section, and the turbine section, the core gas path disposed radially inside of the outer casing, a fan bypass air duct defined by an inner radial flow path boundary and an outer radial flow path boundary, and a member extending between the inner radial flow path boundary and the outer radial flow path boundary;
an outside core annular region radially disposed between the outer casing and the inner radial boundary flow path boundary;
an aft fan annular compartment disposed forward of the outside core annular region, wherein the aft fan annular compartment is defined by the outer casing, an annular aft inner diameter panel, and a firewall;
a fan air circulation system that includes an air inlet disposed within the member,-and-a manifold disposed within the aft fan annular compartment, and a valve, wherein the fan circulation system defines a fan bypass air flow passage that extends from the air inlet, through the manifold, and into the outside core annular region; and
a system controller in communication with the valve and a non-transitory memory storing instructions, which instructions when executed cause the system controller to:

selectively control passage of the flow of fan bypass air into the outside core annular region using the valve, the selective control including passing a first said flow of fan bypass air into the outside core annular region during a first engine operating condition, and passing a second said flow of fan bypass air into the outside core annular region during a second engine operating condition, wherein the first said flow of fan bypass air is volumetrically greater than the second said flow of fan bypass air.

19. The gas turbine engine of claim 18, wherein the first engine operating condition is a take-off condition and the second engine operating condition is a cruise condition.

20. The gas turbine engine of claim 18, wherein the selectively controlled passage of the flow of fan bypass air into the outside core annular region is based on a thermal environment within the outside core annular region.

* * * * *